United States Patent
Lee et al.

(10) Patent No.: US 9,796,528 B2
(45) Date of Patent: Oct. 24, 2017

(54) METHOD FOR OPTIMIZING RELEASE OF TRAY AND SYSTEM USING SAME

(71) Applicant: LG CHEM, LTD., Seoul (KR)

(72) Inventors: Kyuhwang Lee, Daejeon (KR); Hokyung Lee, Daejeon (KR); Juseok Lee, Daejeon (KR); Jayoung Hur, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/906,142

(22) PCT Filed: Sep. 2, 2014

(86) PCT No.: PCT/KR2014/008193
§ 371 (c)(1),
(2) Date: Jan. 19, 2016

(87) PCT Pub. No.: WO2015/034239
PCT Pub. Date: Mar. 12, 2015

(65) Prior Publication Data
US 2016/0167881 A1    Jun. 16, 2016

(30) Foreign Application Priority Data

Sep. 3, 2013  (KR) .................... 10-2013-0105494
Sep. 1, 2014  (KR) .................... 10-2014-0115478

(51) Int. Cl.
*G06F 7/00* (2006.01)
*B65G 1/137* (2006.01)

(52) U.S. Cl.
CPC ................. *B65G 1/1371* (2013.01)

(58) Field of Classification Search
None
See application file for complete search history.

(56) References Cited

U.S. PATENT DOCUMENTS

2006/0182533 A1* 8/2006 Ogi ............... H01L 21/67196
                                                                    414/217

FOREIGN PATENT DOCUMENTS

| CN | 1134909 A | 11/1996 |
|---|---|---|
| JP | 05-147717 A | 6/1993 |
| JP | 07-315520 A | 12/1995 |
| JP | 08-192905 A | 7/1996 |
| JP | 10-167417 A | 6/1998 |
| JP | 11-097207 A | 4/1999 |
| JP | 2002-179215 A | 6/2002 |
| JP | 2003-128212 A | 5/2003 |
| JP | 2007-169015 A | 7/2007 |
| JP | 2011-162319 A | 8/2011 |
| JP | 2012-252926 A | 12/2012 |

(Continued)

*Primary Examiner* — Yolanda Cumbess
(74) *Attorney, Agent, or Firm* — Dentons US LLP

(57) ABSTRACT

The present invention relates to a method of optimizing delivery of trays and a system using the method. The method includes: (a) determining a list of delivery of trays; (b) loading a delivery-required tray in the delivery list on the crane in accordance with a loading priority order; (c) loading, on the crane, another tray that can be simultaneously delivered along with the tray that has been loaded on the crane at (b), if requirement for delivery of the tray that can be simultaneously delivered is within a delivery stand-by limit time; and (d) transferring the trays loaded on the crane at (b) or (c).

20 Claims, 9 Drawing Sheets

(56) References Cited

FOREIGN PATENT DOCUMENTS

| JP | 2013-103836 A | 5/2013 |
|----|---------------|--------|
| KR | 2012-0084192 A | 7/2012 |
| KR | 2013-0025473 A | 3/2013 |

\* cited by examiner

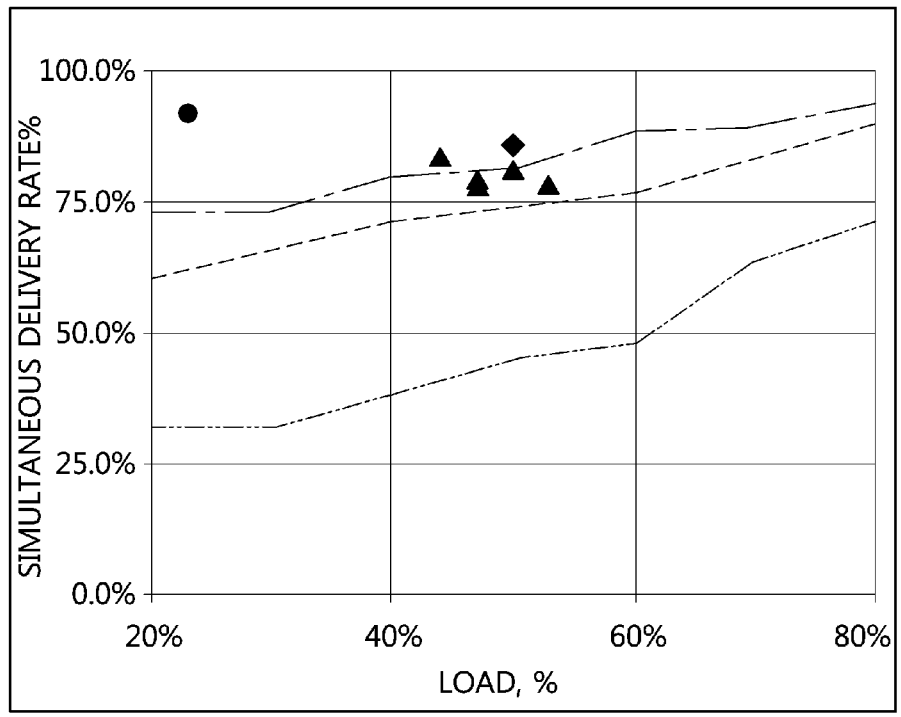

RESULT OF SIMULATION OF UNIT 3 AND RESULT OF
REAL APPLICATION

COMPARATIVE EXAMPLE 1 —··— RESULT OF SIMULATION, DELIVERY STAND-BY LIMIT TIME 3 SECONDS

EXAMPLE 1 ———— RESULT OF SIMULATION, DELIVERY STAND-BY LIMIT TIME 45 SECONDS

EXAMPLE 2 —·— RESULT OF SIMULATION, DELIVERY STAND-BY LIMIT TIME 90 SECONDS

COMPARATIVE EXAMPLE 2 ▲ RESULT OF CHARGE AND DISCHARGE APPARATUS, BEFORE DELIVERY STAND-BY LIMIT TIME IS APPLIED

EXAMPLE 3 ◆ RESULT OF APPLICATION IN SITE, DELIVERY STAND-BY LIMIT TIME 45 SECONDS

EXAMPLE 4 ● RESULT OF APPLICATION IN SITE, DELIVERY STAND-BY LIMIT TIME 90 SECONDS

FIG. 8

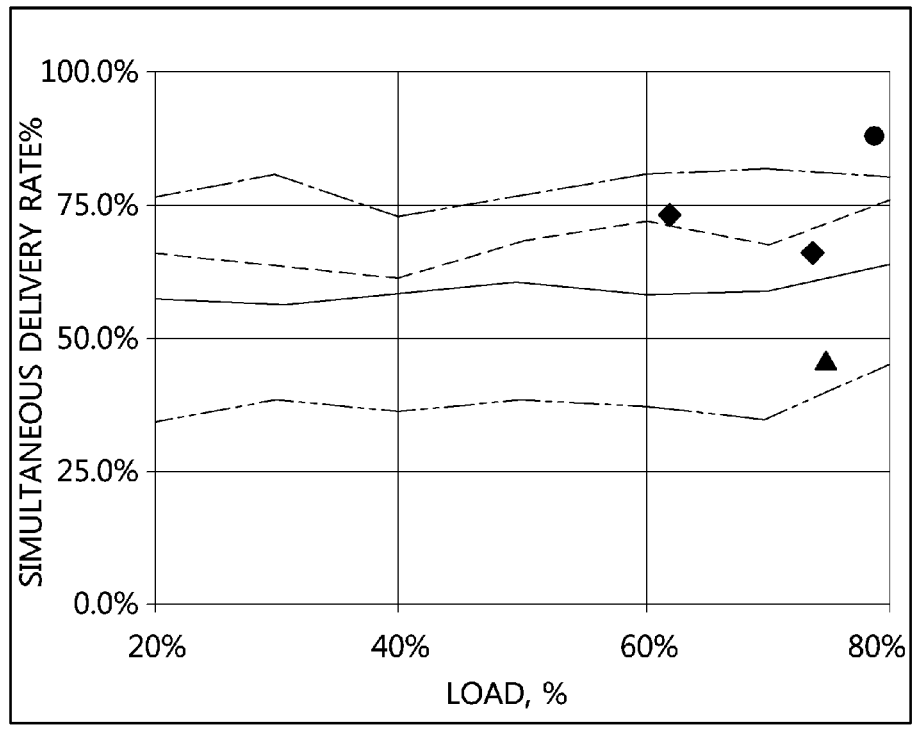

RESULT OF SIMULATION OF UNIT 5 AND RESULT OF
REAL APPLICATION

COMPARATIVE EXAMPLE 3 — - — RESULT OF SIMULATION, DELIVERY STAND-BY LIMIT TIME 3 SECONDS

EXAMPLE 5 — — — RESULT OF SIMULATION, DELIVERY STAND-BY LIMIT TIME 45 SECONDS

EXAMPLE 6 — - — RESULT OF SIMULATION, DELIVERY STAND-BY LIMIT TIME 90 SECONDS

COMPARATIVE EXAMPLE 4 ▲ RESULT OF CHARGE AND DISCHARGE APPARATUS, BEFORE DELIVERYSTAND-BY LIMIT TIME IS APPLIED

EXAMPLE 7 ◆ RESULT OF APPLICATION IN SITE, DELIVERY STAND-BY LIMIT TIME 45 SECONDS

EXAMPLE 8 ● RESULT OF APPLICATION IN SITE, DELIVERY STAND-BY LIMIT TIME 90 SECONDS

FIG. 9

METHOD FOR OPTIMIZING RELEASE OF TRAY AND SYSTEM USING SAME

This application is a National Stage Entry of International Application No. PCT/KR2014/008193, filed Sep. 2, 2014, and claims the benefit of Korean Application No. 10-2013-0105494, filed on Sep. 3, 2013, and Korean Application No. 10-2014-0115478, filed Sep. 1, 2014, all of which are hereby incorporated by reference in their entirety for all purposes as if fully set forth herein.

BACKGROUND OF THE INVENTION

1. Technical Field

The present invention relates generally to method of optimizing delivery of trays and systems using the methods and, more particularly, to a method of optimizing a tray delivery logic by controlling a crane, which transfers the trays, and a system using the method.

2. Description of the Related Art

As demand for high-performance mobile devices increases, demand for improvement in performance of batteries, specially, secondary batteries, is rapidly increasing.

Particularly, middle- or large-sized devices such as notebook computers, portable DVDs, small PCs, electric vehicles or hybrid electric vehicles require use of a battery module including a plurality of battery cells because of a problem of output or capacity.

A process of manufacturing such a battery module includes assembling battery cells and activating the battery. In the operation of activating the battery, battery cells are loaded onto prescribed jigs and then charged under conditions required for activation. Because conventional secondary batteries such as nickel-cadmium batteries or lead storage batteries can be used directly after being produced, a charge and discharge apparatus was required only for performance evaluation. However, for widely used lithium secondary batteries such as lithium-ion batteries and lithium-polymer batteries, a predetermined charge and discharge process, that is, an activation process, after the battery has been manufactured must be conducted to ensure the performance as a battery. Therefore, a charge and discharge apparatus is essential for a line for producing secondary batteries.

During a process of producing a secondary battery, to enable an initial assembled battery to store electric energy, the charge and discharge apparatus is used in such a way that a process of charging and discharging the battery is repeatedly conducted several times so as give the battery characteristics as a secondary battery. With supply of secondary batteries increasing due to urgent demand, efficiently controlling the charge and discharge apparatus, which functions to charge and discharge batteries during the process of producing such batteries, has been required.

For this, in the conventional technique, during the process of activating the secondary batteries, a separate logic on the delivery operation of the charge and discharge apparatus has been used to efficiently control the apparatus. However, as shown in FIG. 1, the conventional delivery logic is configured such that unless there is a plurality of delivery-required trays at the time a delivery requirement signal is received, only a single tray is directly transferred. Therefore, working time is increased, and time required to conduct the process of activating battery cells is thus increased, thereby increasing the production cost.

A technique pertaining to such a delivery logic was proposed in Korean Patent Unexamined Publication No. 2013-0025473. However, this conventional technique relates to a system of more reliably transferring products merely by automating the system. That is, this conventional technique has limits in increasing the efficiency and reducing time and cost.

PRIOR ART DOCUMENT

Patent Document
(Patent document 1) KR2013-0025473 A

SUMMARY OF THE INVENTION

Accordingly, the present invention has been made keeping in mind the above problems occurring in the prior art, and an object of the present invention is to provide a method of optimizing delivery of trays in such a way that trays of the same type are simultaneously delivered, thus reducing working time required to transfer the trays, thereby minimizing time required for delivery of products and reducing the production cost.

In order to accomplish the above object, in an aspect, the present invention provides a method of optimizing delivery of trays by controlling a crane for use in transferring the trays, the method including: (a) determining a list of delivery of trays; (b) loading a delivery-required tray as determined by the list of delivery of trays onto the crane in accordance with a loading priority order; (c) determining if another tray can be simultaneously delivered along with the tray that has been previously loaded onto the crane in step (b), wherein the another tray can be simultaneously delivered along with the tray that has been previously loaded onto the crane if the requirement for delivery of the another tray to be simultaneously delivered is within a delivery stand-by limit time; (d) loading, onto the crane, the another tray to be simultaneously delivered along with the tray that has been previously loaded onto the crane in step (b), if the requirement for the delivery of the another tray can be simultaneously delivered is determined in step (c); and (e) transferring the trays loaded onto the crane in step (b) or (d).

In another aspect, the present invention provides a system for optimizing delivery of trays by controlling a crane for use in transferring the trays, the system including: (a) a delivery information collection module for collecting a list of delivery of trays, the list of delivery of trays including delivery-required trays; (b) a tray loading determination module for determining whether a delivery-required tray as determined by the delivery information collection module is loaded onto a crane in accordance with a loading priority order; (c) an identical-tray loading determination module for: determining whether another tray can be simultaneously delivered along with the tray that has been previously loaded onto the crane by the tray loading determination module of (b), wherein the another tray can be simultaneously delivered along with the tray that has been previously loaded onto the crane if the requirement for the delivery of the another tray to be simultaneously delivered is within a delivery stand-by limit time; and loading, onto the crane, the another tray that can be simultaneously delivered along with the tray that has been loaded onto the crane by the tray loading determination module of (b); and (d) a transfer module for transferring trays loaded onto the crane by the tray loading determination module or the identical-tray loading determination module.

BRIEF DESCRIPTION OF THE DRAWINGS

The above and other objects, features and advantages of the present invention will be more clearly understood from the following detailed description taken in conjunction with the accompanying drawings, in which:

FIG. 8 is a graph showing the result of a test according to an example of the present invention; and FIG. 9 is a graph showing the result of a test according to another example of the present invention.

DESCRIPTION OF THE PREFERRED EMBODIMENTS

Figure 1:
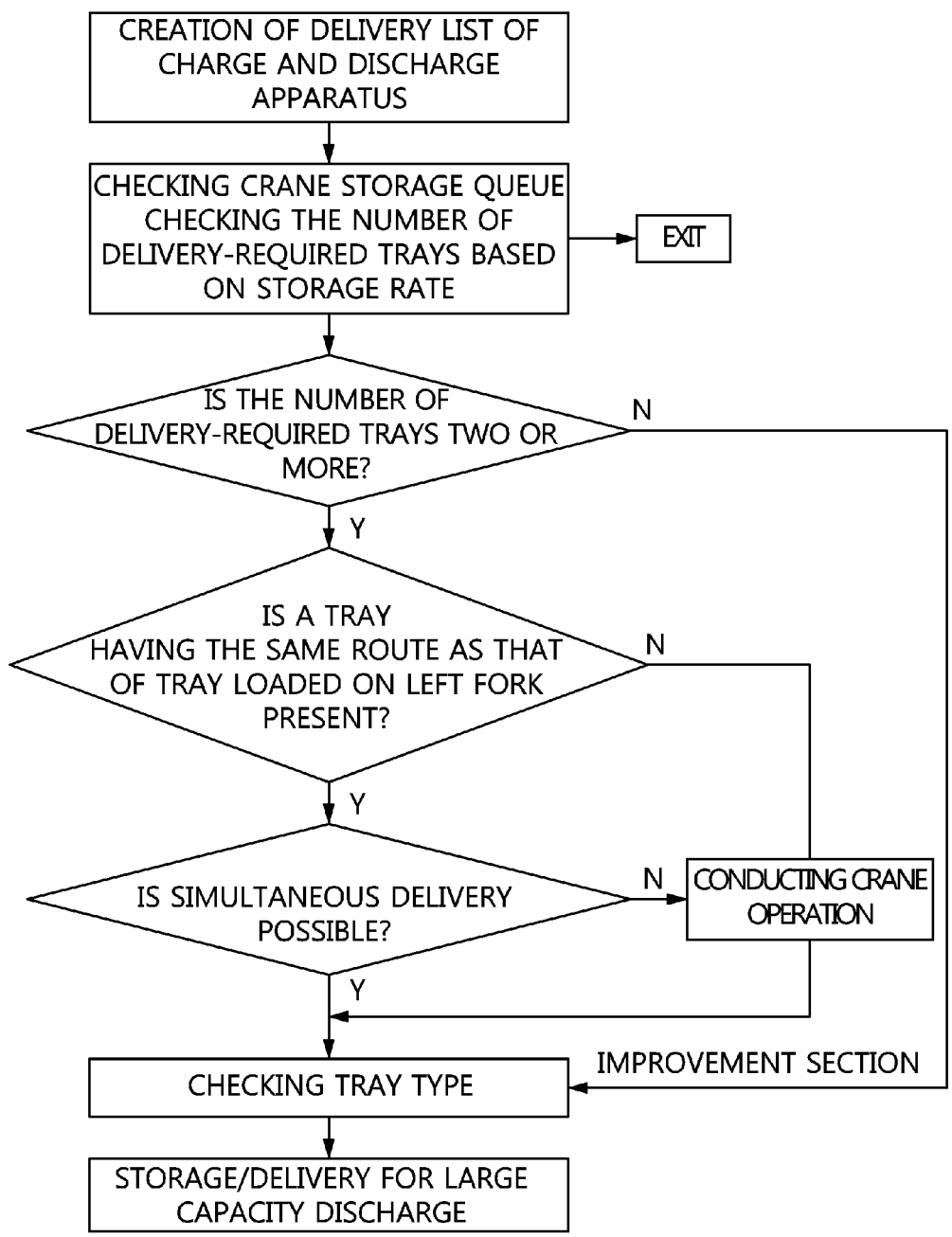
FIG. 1 is a flowchart of a delivery logic according to a conventional method.

Reference now should be made to the drawings, in which the same reference numerals are used throughout the different drawings to designate the same or similar components.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

The present invention provides a method of optimizing delivery of trays by controlling a crane for use in transferring the trays. The method includes: (a) determining a list of delivery of trays; (b) loading a delivery-required tray as determined by the list of delivery of trays onto the crane in accordance with a loading priority order; (c) determining if another tray can be simultaneously delivered along with the tray that has been previously loaded onto the crane in step (b), wherein the another tray can be simultaneously delivered along with the tray that has been previously loaded onto the crane if the requirement for delivery of the another tray to be simultaneously delivered is within a delivery stand-by limit time; (d) loading, onto the crane, the another tray to be simultaneously delivered along with the tray that has been previously loaded onto the crane in step (b), if the requirement for the delivery of the another tray can be simultaneously delivered is determined in step (c); and (e) transferring the trays loaded onto the crane in step (b) or (d).

The method of optimizing delivery of trays according to the present invention can be used without special limitation so long as the trays are for transferring articles. Preferably, the method is used in optimizing delivery of trays in a charge and discharge apparatus, which is used in a secondary cell activation operation.

Figure 2:
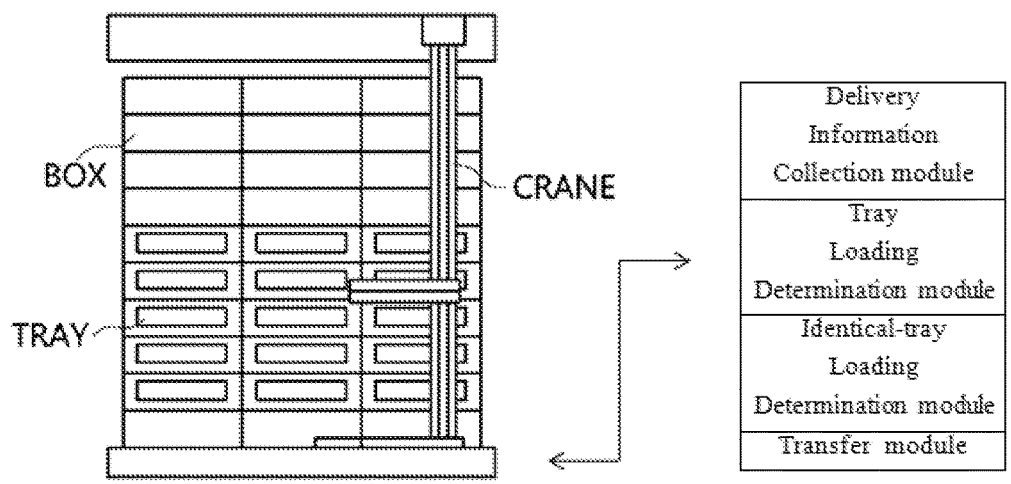
FIG. 2 is a view showing the construction of a charge and discharge apparatus and a system for optimizing delivery of trays.
Figure 3:
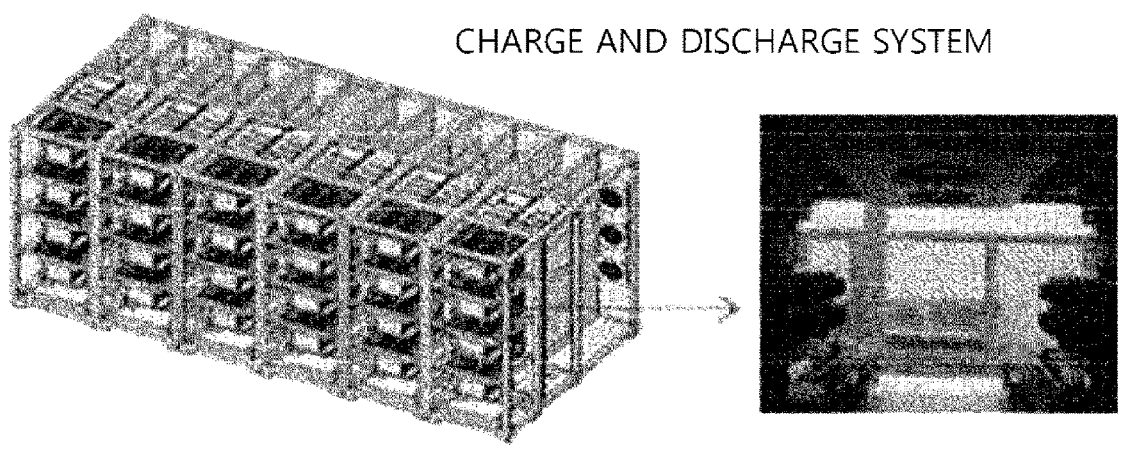
FIG. 3 illustrates a system using the charge and discharge apparatus.

The method of optimizing delivery of trays in the charge and discharge apparatus used in the secondary cell activation operation will be described in detail. A process of manufacturing a battery cell includes an electrode manufacturing operation, an assembly operation, an activation operation and a package and delivery operation. The activation operation includes storing a battery cell, that has passed through the assembly operation, for a predetermined duration to age it, and repeating charge and discharge of the battery cell to enhance the performance of the battery cell. This activation operation is conducted by means of a charge and discharge apparatus with an aging chamber which, as shown in FIG. 2, typically comprises boxes of n rows×m stories. As shown in FIG. 3, the charge and discharge apparatus with an aging chamber is included in the charge and discharge system that repeats charge and discharge, and is involved in the activation operation. When battery cells are stocked onto or delivered from the charge and discharge apparatus with an aging chamber, they are loaded onto the trays and then transferred. Here, the trays are stocked or released using a conveyor belt by a single stacker crane (hereinafter, referred to as a crane).

The charge and discharge apparatus conducts operations such as charging, discharging, performing large capacity of discharge, OCV check, etc. The kind of operation that can be conducted differs by the kinds of boxes. Further, several models of battery cells are simultaneously stocked in a single charge and discharge apparatus, and time it takes to conduct an operation such as charging, discharging, performing large capacity of discharge, etc. differs by model types. Even when battery cells of the same model are stocked together, the time at which each battery cell is stocked differs by the operation time, thus making an expected delivery time of each battery cell different. Storage or delivery requirements of the charge and discharge apparatus are conducted by a predetermined control method or system. In response to such requirement, the crane conducts a corresponding operation. In addition, there is also a storage and delivery logic for the crane corresponding to the storage and delivery requirement of the charge and discharge apparatus.

Therefore, if the method of optimizing delivery of trays according to the present invention is used, time required to conduct the battery cell activation operation can be minimized by controlling the crane which comes and goes to the boxes of the charge and discharge apparatus and the aging chamber and transfers the trays on which the battery cells are placed. Hereinafter, each operation of the method of optimizing delivery of trays according to the present invention will be described in detail.

First, in step (a), a list of delivery of trays is determined. In the list of delivery of trays, the trays that must be transferred to a subsequent process are contained.

Thereafter, in step (b), a delivery-required tray in the delivery list is loaded onto the crane in accordance with a loading priority order. The loading priority order can be set in various ways depending on determination of a user. For example, the trays may be preferentially loaded onto the crane in order closest to the crane. Alternatively, the trays may be loaded onto the crane in such a way that a tray of which the corresponding step has finished first is preferentially loaded onto the crane.

The crane for transferring the trays includes a loading fork. Preferably, the crane includes two or more loading forks.

Subsequently, in step (c), determining if another tray can be simultaneously delivered along with the tray that has been previously loaded onto the crane in step (b), wherein the another tray can be simultaneously delivered along with the tray that has been previously loaded onto the crane if the requirement for delivery of the another tray to be simultaneously delivered is within a delivery stand-by limit time The another tray can be simultaneously delivered along with the tray that has been previously loaded onto the crane means a tray that is the same model and is processed along the same line and through the same following process as those of the tray that has been previously loaded onto the crane. If the tray that has been previously loaded onto the crane and another tray can be simultaneously delivered along with the tray that has been previously loaded onto the crane, are loaded together on the crane, they can be transferred together to the conveyor belt later, whereby they can be simultaneously supplied to a subsequent process. Therefore, time it takes to complete the entire process can be reduced.

The delivery stand-by limit time refers to the maximum time to await, when a tray is loaded onto only one fork of the crane, for delivery of another tray can be simultaneously delivered along with the tray that has been previously loaded onto only one fork of the crane. That is, the delivery stand-by limit time means the maximum time for which the crane on which only one tray has been loaded onto can be await loading of another tray so as to load two trays on the single crane, transfer them and thus reduce time required to complete the entire process. If the delivery stand-by limit time is set to be excessively long, the loading process is excessively delayed, thereby causing a problem of an increase in time required to complete the entire process. If the delivery stand-by limit time is set to be excessively short, a rate of loading two trays onto the crane at the same time is reduced. In this case, the number of loading and transferring processes is increased, and time required to complete the entire process is increased. Therefore, given the entire process, the user can optionally determine the delivery stand-by limit time. Preferably, the delivery stand-by limit time is set to be within a range from 5 seconds to 120 seconds. More preferably, the delivery stand-by limit time is set to be within a range from 30 seconds to 90 seconds and, most preferably, a range from 45 seconds to 90 seconds.

Further, in step (d), if requirement for delivery of the another tray can be simultaneously delivered along with the tray that has been previously loaded onto the crane is not present within the delivery stand-by limit time, only the tray that has been previously loaded onto the crane is delivered. The reason for this is because of the fact that if the crane stands by over the delivery stand-by limit time, the entire process is delayed.

Subsequently, in step (e), the trays loaded onto the crane in step (b) or (d) are transferred. The trays can be transferred by means of the conveyor belt. The trays loaded onto the crane together in step (d) are placed in double layers on the conveyor belt before being transferred. By virtue of this, a rate of loading trays during a transfer process can be enhanced, whereby temporal and spatial efficiency can be increased, and an overall delivery rate can be enhanced.

As a result, trays are delivered in a single or double layered state. As described above, an increase of a rate of loading trays in double layers makes transfer of products during the activation process more efficient.

Figure 4:
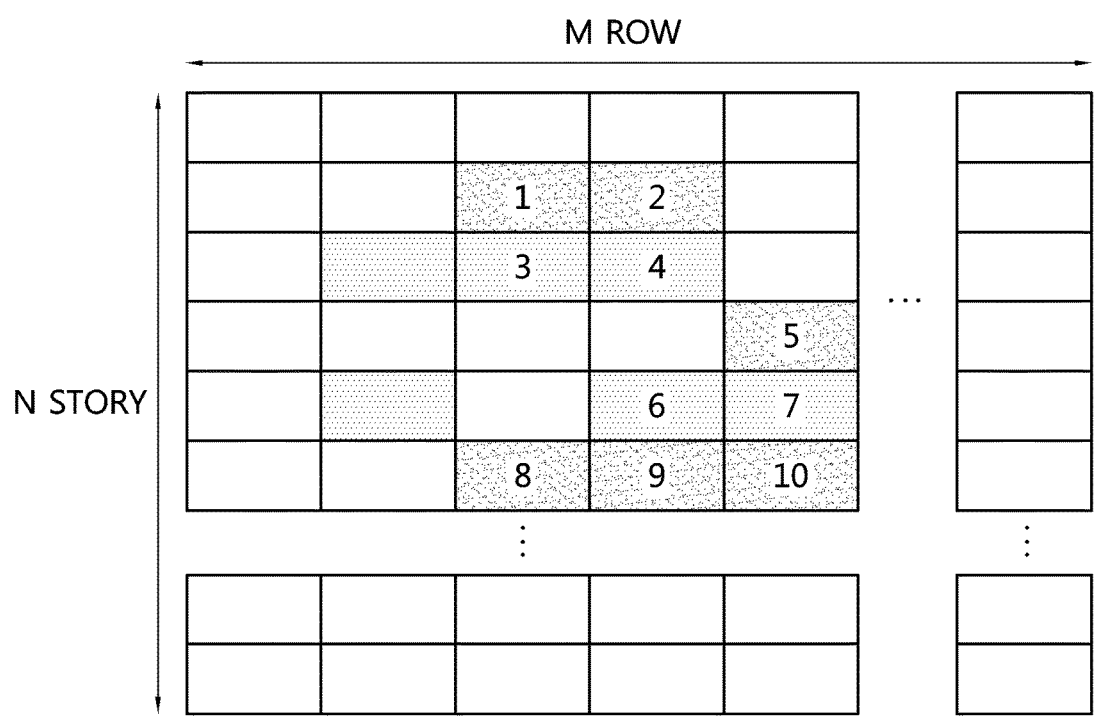
FIG. 4 is a view showing a concrete example of the construction of the charge and discharge apparatus.

The method of optimizing delivery of trays according to the present invention will be described in more detail. FIG. 4 illustrates a charge and discharge apparatus, in which trays are arranged in n rows×m stories, using the method of optimizing delivery of trays according to the present invention.

Figure 5A:
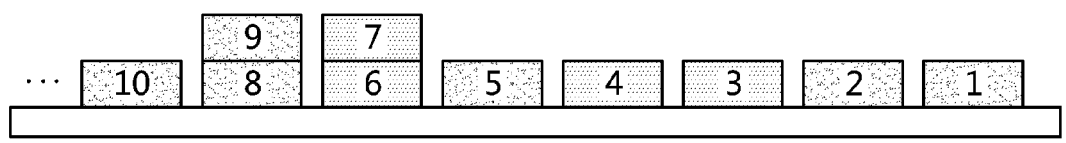
FIGS. 5a and 5b are views comparing a process of loading trays on a conveyor belt according to the method of the present invention with that of a conventional technique.
Figure 5B:
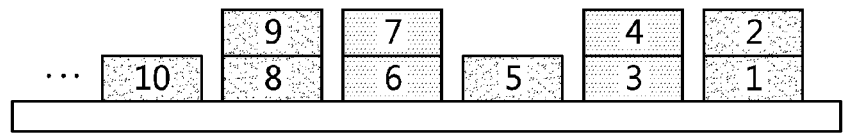
Figure 6A:
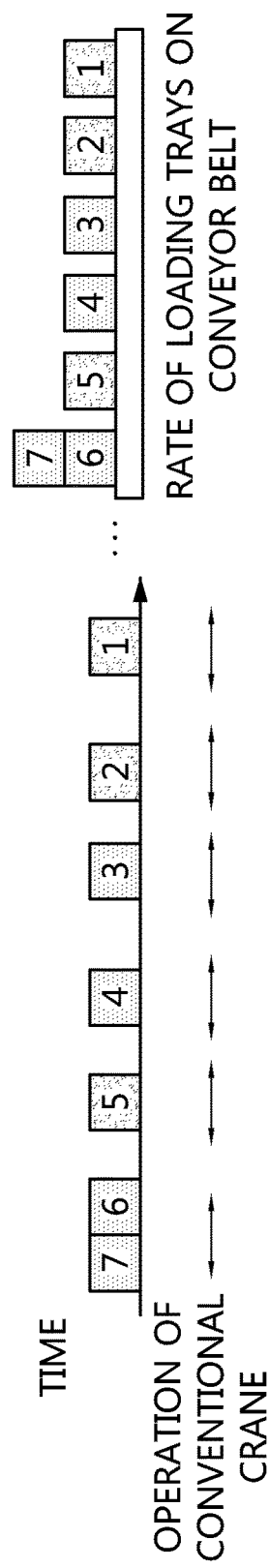
FIGS. 6a and 6b are views comparing a tray loading operation of a crane according to the method of the present invention with that of a conventional technique.
Figure 6B:
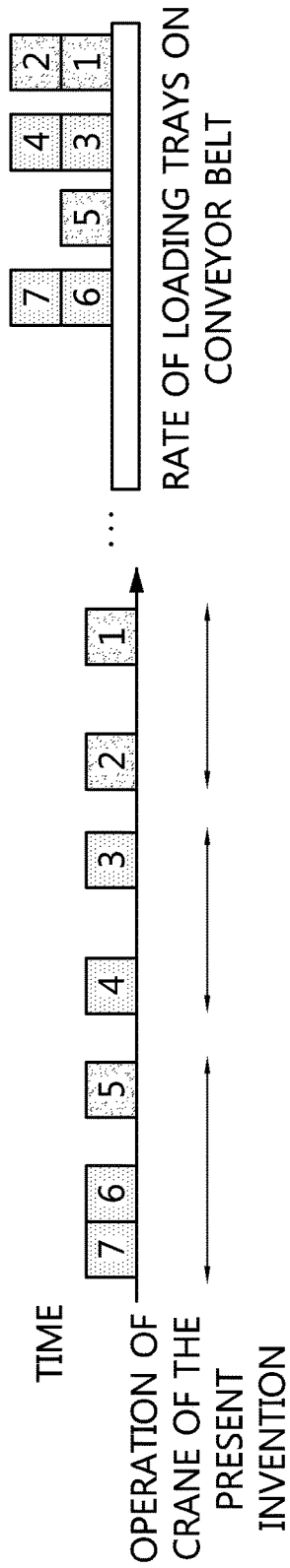

Requirement of delivery with regard to tray 1 to 10 is successively received. Here, each of pairs of tray 1 and tray 2, tray 3 and tray 4, tray 6 and tray 7, and tray 8 and tray 9 can be delivered together at the same time. It is assumed that among these trays, requirement of simultaneous delivery for a pair of tray 6 and tray 7, tray 8 and tray 9 has been received. With regard to this, in the conventional delivery method, as shown in FIG. 5a, the trays are loaded onto the conveyor belt in consecutive order. In more detail, as shown in FIG. 6a, tray 1, tray 2, tray 3 and tray 4 are separately loaded onto the conveyor belt and transferred because requirement of delivery for them is not simultaneously received. However, in the method according to the present invention, as shown in FIG. 5b, the trays are simultaneously loaded onto the crane after standing by for a predetermined time, that is, a delivery stand-by limit time. In detail, as shown in FIG. 6b, tray 1 and tray 2, which can be simultaneously loaded onto the crane, are loaded onto the conveyor belt at the same time, and tray 3 and tray 4 are also loaded onto the conveyor belt. As such, because the trays are loaded in double layers onto the conveyor belt, space required to load the trays is reduced, thus increasing spatial efficiency. In addition, because the number of movement of the crane is reduced, time required to load the trays is reduced, whereby temporal efficiency is also increased.

The present invention also provides a system for optimizing delivery of trays by controlling a crane for use in transferring the trays.

The system includes: (a) a delivery information collection module for collecting a list of delivery of trays, the list of delivery of trays including delivery-required trays; (b) a tray loading determination module for determining whether a delivery-required tray as determined by the delivery information collection module is loaded onto a crane in accordance with a loading priority order; (c) an identical-tray loading determination module for: determining whether another tray can be simultaneously delivered along with the tray that has been previously loaded onto the crane by the tray loading determination module of (b), wherein the another tray can be simultaneously delivered along with the tray that has been previously loaded onto the crane if the requirement for the delivery of the another tray to be simultaneously delivered is within a delivery stand-by limit time; and loading, onto the crane, the another tray that can be simultaneously delivered along with the tray that has been loaded onto the crane by the tray loading determination module of (b); and (d) a transfer module for transferring trays loaded onto the crane by the tray loading determination module or the identical-tray loading determination module.

The system for optimizing delivery of trays according to the present invention can be used without special limitation so long as the trays are for transferring articles. Preferably, the system is used in optimizing delivery of trays in a charge and discharge apparatus, which is used in a secondary cell activation operation.

The loading priority order in the tray loading determination module is configured in such a way that the trays are preferentially loaded onto the crane in order closest to the crane.

The identical-tray loading determination module selects, as the another tray can be simultaneously delivered along with the tray that has been previously loaded onto the crane, the another tray that is the same model and is processed along the same line and through the same following process of the tray that has been previously loaded onto the crane.

In the identical-tray loading determination module, the delivery stand-by limit time is set to be within a range from 5 seconds to 120 seconds. Preferably, the delivery stand-by limit time is set to be within a range from 30 seconds to 90 seconds and, more preferably, a range from 45 seconds to 90 seconds.

If requirement for delivery of the another tray can be simultaneously delivered along with the tray that has been previously loaded onto the crane is not present within the delivery stand-by limit time, the identical-tray loading determination module delivers only the tray that has been previously loaded onto the crane.

The trays that have been loaded together by the identical-tray loading determination module are placed in double layers in the transfer module and transferred by the transfer module.

Figure 7:
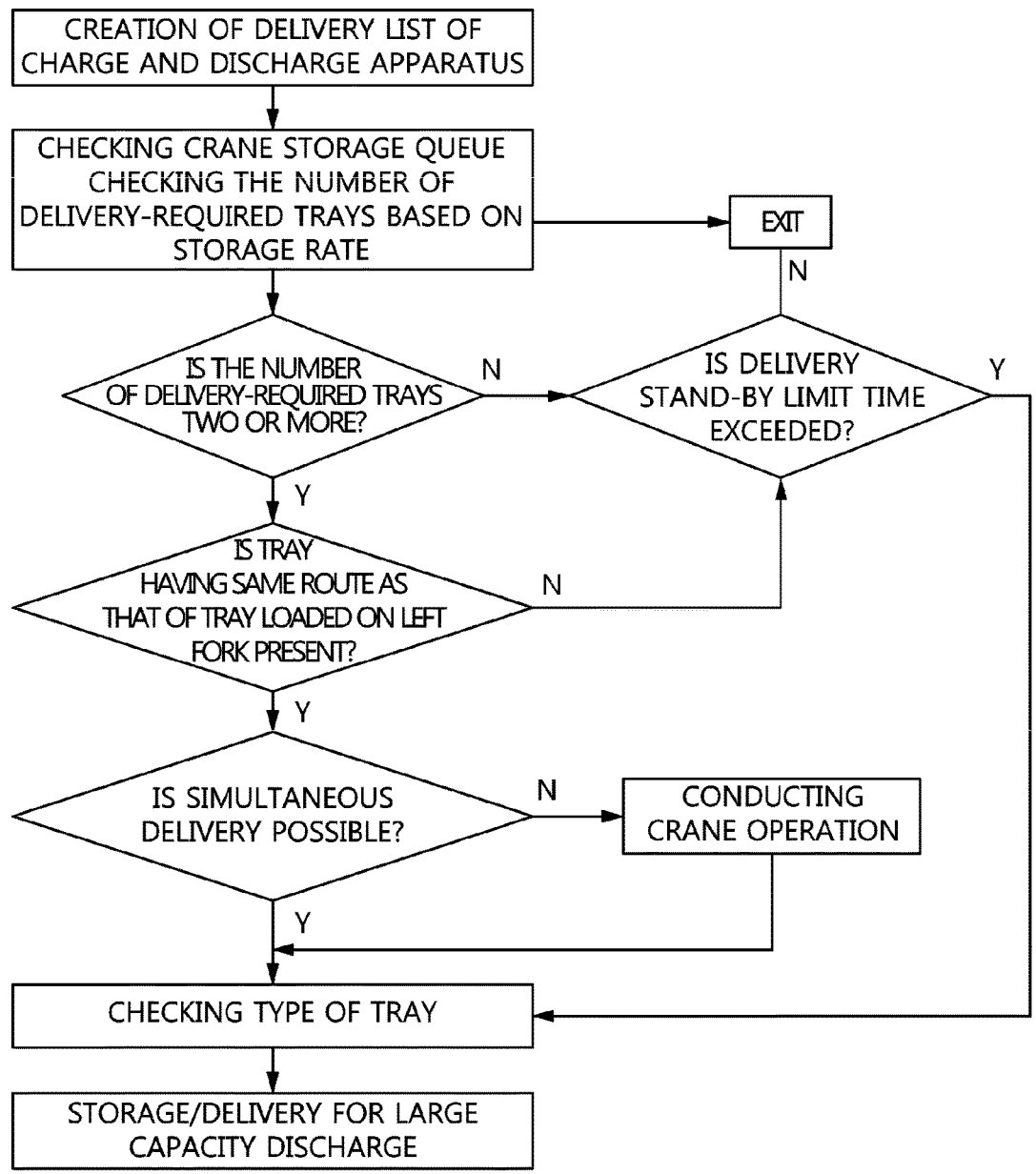
FIG. 7 is a flowchart of an example of a delivery logic of the charge and discharge apparatus according to the method of the present invention.

FIG. 7 shows a tray delivery logic of the charge and discharge apparatus as an illustrative example of the system for optimizing delivery of trays according to the present invention.

The term "module" indicates a unit for processing at least one function or operation, and it can be embodied by hardware, software or a combination of hardware and software.

A better understanding of the present invention may be obtained through the following example, which is set forth to illustrate, but is not to be construed as limiting the present invention.

Therefore, it is intended that the bounds of the present invention are defined by the accompanying claims, and various modifications, additions and substitutions, which can be derived from the meaning, scope and equivalent concepts of the accompanying claims, fall within the bounds of the present invention.

EXAMPLE

With regard to the method of optimizing delivery of trays according to the present invention, a delivery optimization simulation of the charge and discharge apparatus was conducted. After the result in accordance with the delivery stand-by limit time was examined, the method was applied to a real site, and the result thereof was examined. The simulation was conducted using an integrated unit No. 3, apparatus XPB P1.4, of the factory of the applicant of the present invention.

First, for a process simulation, the delivery stand-by limit time was set to be 3 seconds, 45 seconds and 90 seconds. As shown in FIGS. 8 and 9, a simultaneous delivery rate (%) as a function of a process load (%) was examined with regard to comparative examples 1 and 3, Examples 1, 2, 5 and 6. As can be understood from FIGS. 8 and 9, the simultaneous delivery rate (%) as a function of the process load (%) of the embodiments 1 and 2 and the embodiments 5 and 6 in which the delivery stand-by limit time is set to be relatively long was higher than that of the comparative examples 1 and 3 in which the delivery stand-by limit time is set to be relatively short. Furthermore, it can be understood that as the delivery stand-by limit time is increased, the simultaneous delivery rate is increased in the whole range of the process load.

Furthermore, on the basis of the process simulation, the result of a simultaneous delivery rate (%) as a function of a process load (%) applied to a real site was expressed in comparative examples 2 and 4, examples 3, 4, 7 and 8 with the delivery stand-by limit time set to be 3 seconds, 45 seconds and 90 seconds.

As can be appreciated from FIGS. 8 and 9, the simultaneous delivery rate (%) as a function of the process load (%) of the examples 3, 4, 7 and 8 was higher than that of comparative examples 2 and 4 in which the delivery stand-by limit time was not applied. In addition, it can be understood that as the delivery stand-by limit time is increased, the simultaneous delivery rate is increased in the whole range of the process load.

As described above, a method of optimizing delivery of trays according to the present invention can reduce working time required to transfer trays, thus minimizing time required for delivery of products, thereby reducing the production cost.

Although the preferred examples of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of optimizing delivery of trays by controlling a crane for use in transferring the trays, the method comprising:
    (a) determining a list of delivery of trays;
    (b) loading a delivery-required tray as determined by the list of delivery trays onto the crane in accordance with a loading priority order;
    (c) determining if another tray can be simultaneously delivered along with the tray that has been previously loaded onto the crane at step (b), wherein the another tray can be simultaneously delivered along with the tray that has been previously loaded onto the crane if the requirement for delivery of the another tray to be simultaneously delivered is within a delivery stand-by limit time;
    (d) loading, onto the crane, the another tray to be simultaneously delivered along with the tray that has been previously loaded onto the crane at step (b), if the requirement for the delivery of the another tray can be simultaneously delivered is determined in step (c); and
    (e) transferring the trays loaded onto the crane at steps (b) or (d).

2. The method as set forth in claim 1, wherein the delivery stand-by limit time ranges from 5 seconds to 120 seconds.

3. The method as set forth in claim 1, wherein the delivery stand-by limit time ranges from 30 seconds to 90 seconds.

4. The method as set forth in claim 1, wherein the delivery stand-by limit time ranges from 45 seconds to 90 seconds.

5. The method as set forth in claim 1, wherein the loading priority of the trays includes loading the trays in order based upon the distance from the crane, the trays that are closest to the crane are loaded first.

6. The method as set forth in claim 1, wherein the crane comprises two loading forks.

7. The method as set forth in claim 1, wherein the another tray that can be simultaneously delivered is a same model as that of the tray that has been previously loaded onto the crane and the another tray is processed along a same line and through a same following process as that of the tray that has been previously loaded onto the crane.

8. The method as set forth in claim 1, wherein when requirement for delivery of a tray that can be simultaneously delivered along with the tray that has been previously loaded onto the crane is not present within the delivery stand-by limit time are determined in step (c), only the tray that has been previously loaded onto the crane is delivered.

9. The method as set forth in claim 1, wherein the trays that have been loaded together onto the crane in (c) are placed in double layers and transferred in (d).

10. The method as set forth in claim 1, wherein each of the trays is characterized as being used in a process of charging or discharging a battery.

11. A system for optimizing delivery of trays by controlling a crane for use in transferring the trays, the system comprising:
  (a) a delivery information collection module for collecting a list of delivery of trays, the list of delivery of trays including delivery-ready trays;
  (b) a tray loading determination module for determining whether a delivery-required tray as determined by the delivery information collection module is loaded onto a crane in accordance with a loading priority order;
  (c) an identical-tray loading determination module for:
    determining whether another tray can be simultaneously delivered along with the tray that has been previously loaded onto the crane by the tray loading determination module in step (b), wherein the another tray can be simultaneously delivered along with the tray that has been previously loaded onto the crane if the requirement for the delivery of the another tray to be simultaneously delivered is within a delivery stand-by limit time; and loading, onto the crane, the another tray that can be simultaneously delivered along with the tray that has been loaded onto the crane by the tray loading determination module of (b); and
  (d) a transfer module for transferring trays loaded onto the crane by the tray loading determination module or the identical-tray loading determination module.

12. The system as set forth in claim 11, wherein the delivery stand-by limit time ranges from 5 seconds to 120 seconds.

13. The system as set forth in claim 11, wherein the delivery stand-by limit time ranges from 30 seconds to 90 seconds.

14. The system as set forth in claim 11, wherein the delivery stand-by limit time ranges from 45 seconds to 90 seconds.

15. The system as set forth in claim 11, wherein the loading priority of the trays includes loading the trays in order based upon the distance from the crane, the trays that are closest to the crane are loaded first.

16. The system as set forth in claim 11, wherein the crane comprises two loading forks.

17. The system as set forth in claim 11, wherein the another tray that can be simultaneously delivered is a same model as that of the tray that has been previously loaded onto the crane and the another tray is processed along a same line and through a same following process as those of the tray that has been previously loaded onto the crane.

18. The system as set forth in claim 11, wherein when requirement for delivery of a tray that can be simultaneously delivered along with the tray that has been previously loaded onto the crane is not present within the delivery stand-by limit time are determined in step (c) identical-tray loading determination module, only the tray that has been previously loaded onto the crane is delivered.

19. The system as set forth in claim 11, wherein the trays that have been loaded together onto the crane as determined by the identical-tray loading determination module in step (c) are placed in double layers and transferred by the transfer module in step (d).

20. The system as set forth in claim 11, wherein each of the trays is characterized as being used in a process of charging or discharging a battery.

* * * * *